United States Patent
Yoshida

(10) Patent No.: US 7,420,300 B2
(45) Date of Patent: Sep. 2, 2008

(54) VOICE COIL MOTOR

(75) Inventor: Shusaku Yoshida, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 292 days.

(21) Appl. No.: 10/516,460

(22) PCT Filed: Jun. 2, 2003

(86) PCT No.: PCT/JP03/06961

§ 371 (c)(1),
(2), (4) Date: Dec. 3, 2004

(87) PCT Pub. No.: WO03/103115

PCT Pub. Date: Dec. 11, 2003

(65) Prior Publication Data

US 2005/0206245 A1  Sep. 22, 2005

(30) Foreign Application Priority Data

Jun. 4, 2002 (JP) .............................. 2002-162896

(51) Int. Cl.
*H02K 33/18* (2006.01)
*H02K 33/00* (2006.01)

(52) U.S. Cl. ........................... 310/17; 310/15
(58) Field of Classification Search .................. 310/13; 381/400, 403; 336/130–132
See application file for complete search history.

(56) References Cited

U.S. PATENT DOCUMENTS

| 3,439,198 | A | * | 4/1969 | Lee ............................... 310/13 |
| 3,619,673 | A | * | 11/1971 | Helms .......................... 310/13 |
| 3,659,124 | A | * | 4/1972 | Lathrop ........................ 310/13 |
| 3,751,693 | A | * | 8/1973 | Gabor ........................... 310/13 |
| 4,144,466 | A | * | 3/1979 | Hatch ........................... 310/13 |
| 4,242,606 | A | * | 12/1980 | Nonnenmann ............... 310/12 |
| 4,728,831 | A | * | 3/1988 | Cheng .......................... 310/13 |
| 5,541,777 | A | | 7/1996 | Sakamoto et al. |
| 5,677,963 | A | * | 10/1997 | Morcos et al. ............... 381/412 |
| 5,777,403 | A | * | 7/1998 | Yuan ............................. 310/12 |
| 5,798,582 | A | | 8/1998 | Neff |
| 6,067,365 | A | * | 5/2000 | Morenz ........................ 381/412 |
| 6,184,597 | B1 | | 2/2001 | Yamamoto et al. |
| 6,302,626 | B1 | | 10/2001 | Du et al. |
| 6,487,053 | B1 | * | 11/2002 | Matsumura et al. ........ 360/265.7 |
| 6,490,363 | B1 | * | 12/2002 | Liu ............................... 381/403 |
| 6,713,904 | B2 | * | 3/2004 | Godkin ......................... 310/13 |
| 6,894,408 | B2 | * | 5/2005 | Godkin ......................... 310/13 |
| 2002/0014937 | A1 | | 2/2002 | Tanozaki |
| 2005/0206245 | A1 | * | 9/2005 | Yoshida ........................ 310/12 |

FOREIGN PATENT DOCUMENTS

| EP | 0084124 A2 | 7/1983 |
| JP | 61-273162 A | 12/1986 |
| JP | 6-12796 A | 1/1994 |
| JP | 11-313476 A | 11/1999 |

OTHER PUBLICATIONS

Chinese Office Action dated Nov. 9, 2007 for Application No. 3812866.7.

* cited by examiner

*Primary Examiner*—Burton Mullins
(74) *Attorney, Agent, or Firm*—Sughrue Mion, PLLC

(57) ABSTRACT

A voice coil motor of the movable coil type comprising a stator including a permanent magnet. The stator produces a magnetic field. A movable element made of an armature coil is provided. The armature coil is formed into a coil-shape having a cavity portion. A reinforcing beam made of non-magnetic and highly rigid material is formed at a substantial center of the cavity portion.

1 Claim, 7 Drawing Sheets

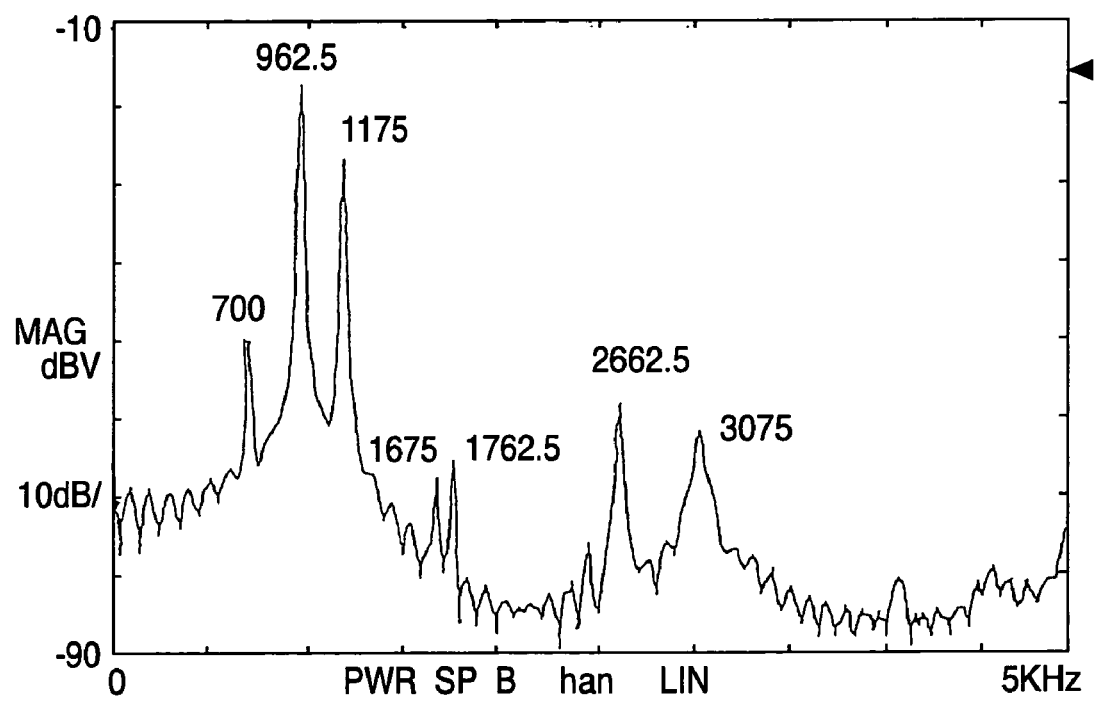

ABSTRACT# VOICE COIL MOTOR

TECHNICAL FIELD

The present invention relates to a movable coil type voice coil motor especially used for a semiconductor related device, a machine tool and so forth.

BACKGROUND OF THE INVENTION

It is a mainstream that the voice coil motor is of the movable coil type in which the stator includes a permanent magnet, which becomes a magnetic field, and the movable element includes an armature coil.

Concerning the stator, the following two types are used.

(1) When a view is taken from the side, the stator is formed into an E-shape, and one end of the yoke is open, so that the movable element can be detached.

(2) When a view is taken from the side, the stator is formed into a θ-shape, and one end of the yoke is closed, so that the movable element can not be detached.

The movable element includes an air-core coil formed into a cylindrical shape or a square cylindrical shape. Alternatively, the movable element includes a coil wound round a non-magnetic thin bobbin made of engineering plastics or light metal.

FIG. 4 is a projection drawing showing a voice coil motor of the prior art, the side of the stator of which is formed into the θ-shape, wherein FIG. 4(a) is a partially sectional front view, and FIG. 4(b) is a side view.

In FIG. 4, the stator 41 includes: a yoke 42 made of iron; a permanent magnet 43; and a center yoke 44. In many cases, the thin copper sheet 46 is wound round the center yoke 44 so as to reduce inductance.

The movable element 47 includes: a coil 48; and a movable element attaching member 49. In some cases, the movable element 47 includes a bobbin 52 (shown in FIG. 5) round which the coil 48 is wound.

The movable element 47 is held by a bearing not shown capable of moving linearly in the axial direction. When a DC current is made to flow in the coil 48, the movable element 47 can be moved in the arrowed direction (shown in FIG. 4(a)) by the Fleming's left-hand rule. When the polarity of the electric current is inverted, the moving direction can be reversed.

However, the following problems are caused in the above voice coil motor of the prior art.

FIG. 5 is a perspective view of the movable element of the conventional voice coil motor. In FIG. 5, the thickness t of the coil 48 in the wire stacking direction greatly affects the magnetic circuit of the stator. Therefore, it is impossible to extremely reduce the thickness t of the coil 48. Accordingly, the rigidity of the movable element relies on only the non-magnetic thin bobbin 52 or on varnish and impregnation resin applied at the time of winding the coil. Therefore, the rigidity of the movable element is relatively low. This relatively low rigidity hinders improvements in the control characteristic of the voice coil motor.

DISCLOSURE OF THE INVENTION

It is an object of the present invention to enhance the rigidity characteristic of a voice coil motor, which has been improved recently, without affecting a magnetic circuit.

In order to solve the above problems, the present invention described in claim 1 provides a voice coil motor of the movable coil type including: a stator of a permanent magnet which becomes a magnetic field; and a movable element of an armature coil, wherein the armature coil is formed into a coil-shape having a cavity portion, and a reinforcing beam made of non-magnetic and highly rigid material is formed at a substantial center of the cavity portion. According to this constitution, the rigidity of the movable element can be enhanced.

Further, the invention described in claim 2 provides a voice coil motor of the movable coil type including: a stator of a permanent magnet which becomes a magnetic field; and a movable element of an armature coil, wherein a highly rigid reinforcing member, the shape of which is the same as the coil section, is arranged at an end face of the coil.

Furthermore, the invention described in claim 3 provides a voice coil motor of the movable coil type including: a stator of a permanent magnet which becomes a magnetic field; and a movable element of an armature coil, wherein the armature coil is formed into a coil-shape having a cavity portion, a reinforcing beam made of non-magnetic and highly rigid material is formed at a substantial center of the cavity portion, and a highly rigid reinforcing member, the shape of which is the same as the coil section, is arranged at an end face of the coil.

According to the above constitution, the rigidity of the movable element is highly enhanced.

The non-magnetic and highly rigid reinforcing beam arranged at the substantial center of the cavity portion of the coil is effective for preventing the occurrence of crushing and twisting of the coil.

The highly rigid reinforcing members arranged on both end faces of the coil are also effective for preventing the occurrence of crushing of the coil. As a result, the rigidity of the movable coil can be enhanced.

As described above, the present invention provides a voice coil motor of the movable coil type including: a stator of a permanent magnet which becomes a magnetic field; and a movable element of an armature coil, wherein the armature coil is formed into a coil-shape having a cavity portion, a reinforcing beam made of non-magnetic and highly rigid material is formed at a substantial center of the cavity portion, and a highly rigid reinforcing member, the shape of which is the same as the coil section, is arranged at an end face of the coil. Due to the above constitution, the reinforcing beam and the reinforcing ring prevent the coil from being deformed. Therefore, it is possible for the reinforcing beam and the reinforcing ring to greatly contribute an enhancement of the rigidity of the movable coil.

BRIEF DESCRIPTION OF THE DRAWINGS

FIG. 1 is a projection drawing showing the entire voice coil motor of the first embodiment of the present invention, wherein FIG. 4 is a projection drawing showing a voice coil motor of the prior art, the shape of the side of the stator of which is formed into the θ-shape, wherein FIG. 7 is a diagram showing a result of measurement of the natural frequency of the movable element of the prior art

BEST MODE FOR CARRYING OUT THE INVENTION

Referring the drawings, the present invention will be explained in detail as follows.

Figure 1A:
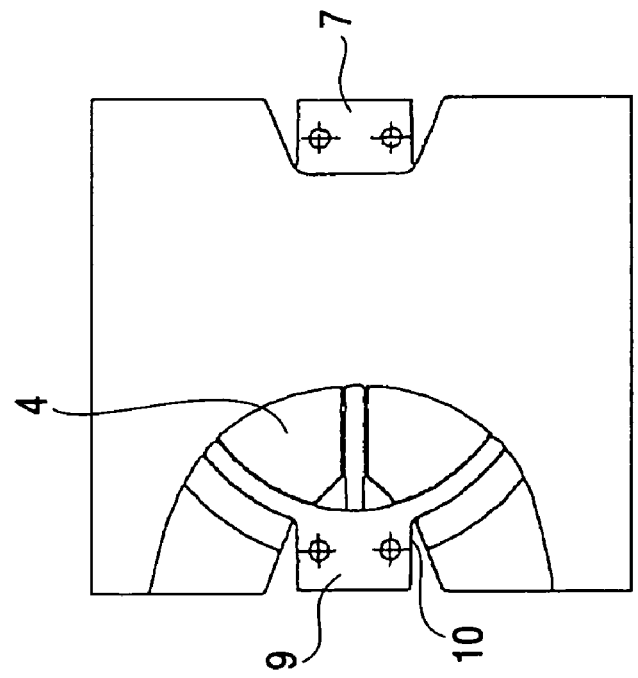
FIG. 1(a) is a side view and FIG. 1(b) is a partially sectional front view.
Figure 1B:
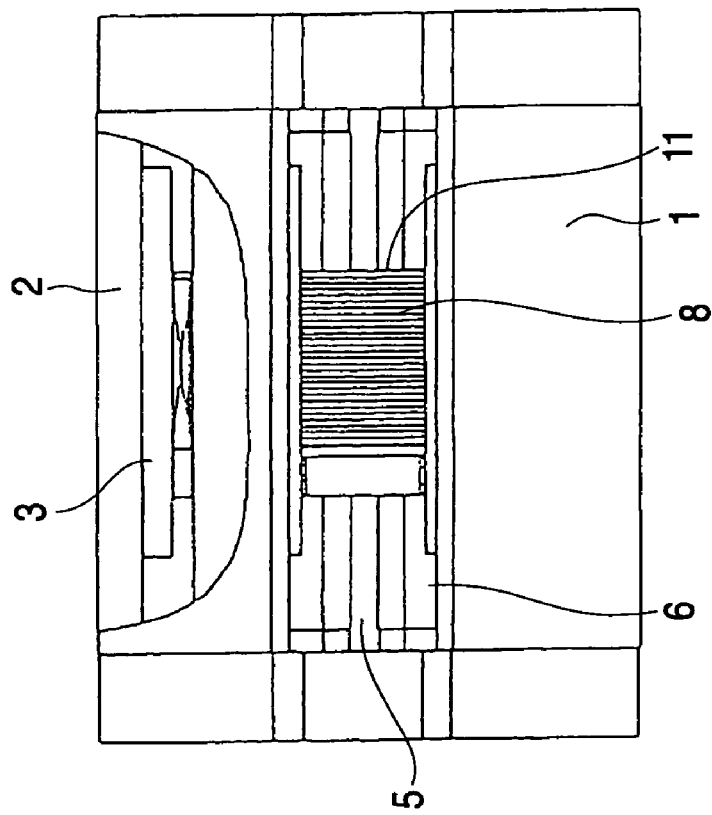
Figure 2:
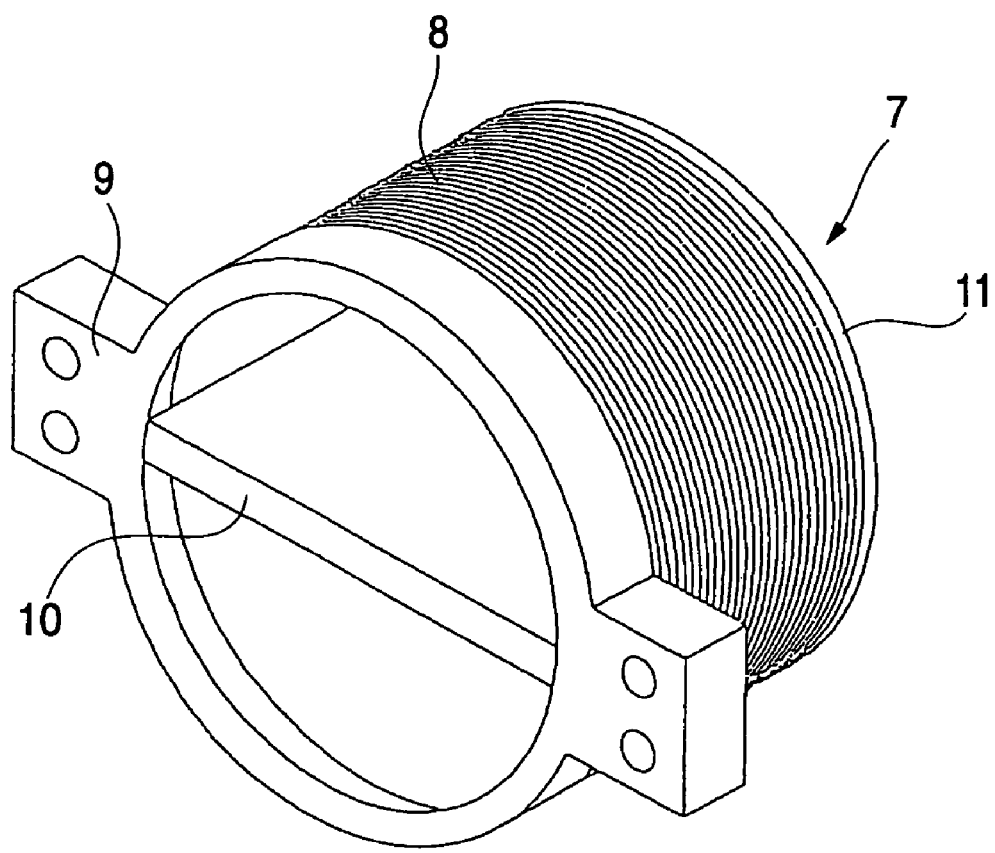
FIG. 2 is a perspective view showing a movable element of the voice coil motor illustrated in FIG. 1.
Figure 4B:
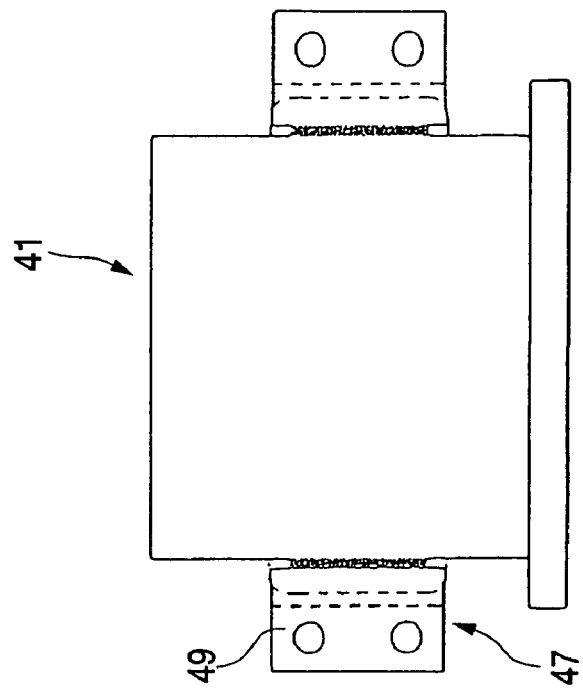
FIG. 4(a) is a partially sectional front view and FIG. 4(b) is a side view.
Figure 4A:
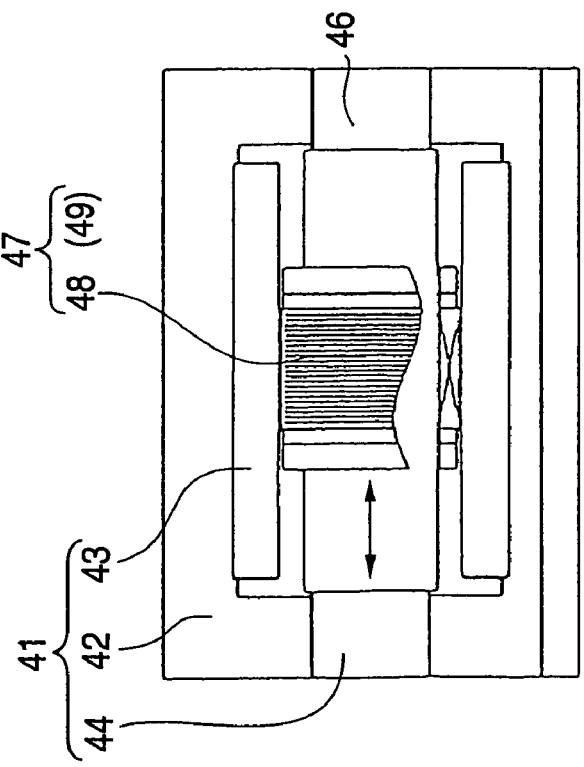
Figure 5:
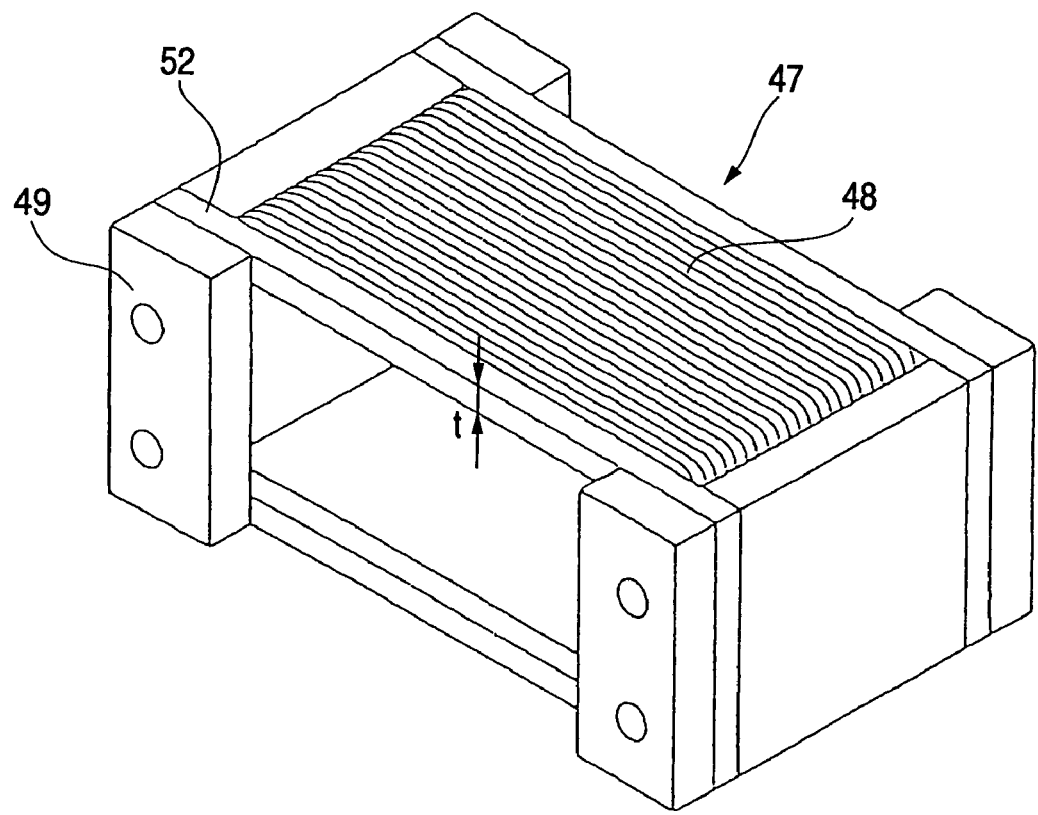
FIG. 5 is a perspective view of a movable element of the voice coil motor shown in FIG. 4.

FIG. 1 is a projection drawing showing the entire voice coil motor of the first embodiment of the present invention, wherein FIG. 1(a) is a side view and FIG. 1(b) is a partially sectional front view. FIG. 2 is a perspective view showing a movable element of the voice coil motor illustrated in FIG. 1. In FIGS. 4 and 5 showing the prior art, the movable element is formed into a square-cylinder-shaped coil. However, in the embodiment shown in FIG. 1, the movable element is formed into a cylindrical coil. This embodiment will be explained as follows.

In FIG. 1, reference numeral 1 is a stator, reference numeral 2 is a yoke, reference numeral 3 is a permanent magnet, reference numeral 4 is a center yoke, reference numeral 5 is a gap, reference numeral 6 is a thin copper sheet, reference numeral 7 is a movable element, reference numeral 8 is a coil, reference numeral 9 is a movable element attaching member, reference numeral 10 is a reinforcing beam, and reference numeral 11 is a reinforcing ring.

The stator 1 includes: a yoke 2, a permanent magnet 3, a center yoke 4 and a thin copper sheet 6. According to the present invention, the center yoke 4 is divided into two portions so that the gap 5, which becomes a passage of the reinforcing beam 10, can be ensured.

The movable element 7 includes: a coil 8, a movable element attaching member 9, a reinforcing beam 10 and a reinforcing ring 11. In this embodiment, the movable element attaching member 9 also functions as a highly rigid reinforcing member arranged on the coil end face.

The movable element attaching member 9, the reinforcing beam 10 and the reinforcing ring 11 are strongly fixed to the coil 8 by means of adhesion or by means of varnish or impregnation resin applied at the time of winding the coil.

As described above, according to the present embodiment, when the armature coil (the movable element 7) is formed into a coil-shape having a cavity portion and the reinforcing beam 10 made of non-magnetic and highly rigid material is arranged at the substantial center of the cavity portion, deformation of the movable coil 8 is prevented by the reinforcing beam 10. Accordingly, the rigidity of the movable coil 8 can be greatly enhanced.

When the highly rigid reinforcing member 11, the shape of which is the same as the coil section, is arranged on the end face of the coil 8, deformation of the coil 8 can be prevented by the reinforcing beam 10 and the reinforcing ring 11. Therefore, the rigidity of the movable coil 8 can be greatly enhanced.

Figure 3:
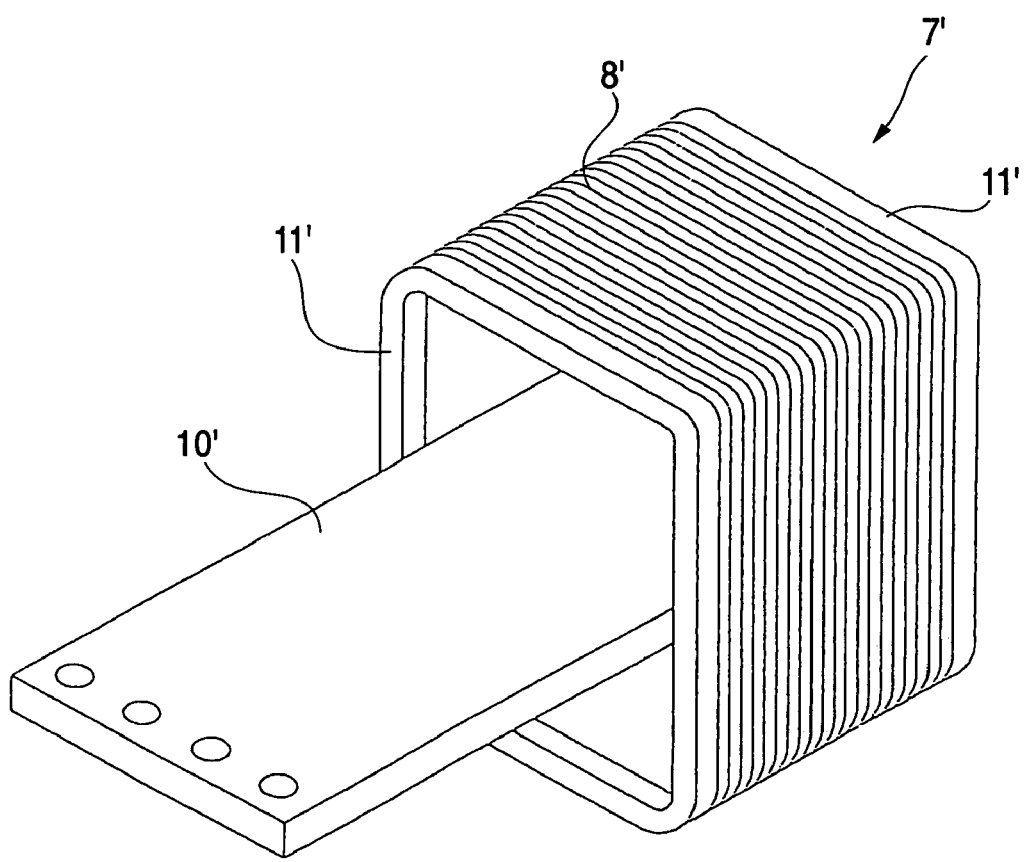
FIG. 3 is a perspective view showing a movable element of the voice coil motor of the second embodiment of the present invention.

FIG. 3 is a perspective view showing a voice coil motor movable element of the second embodiment of the present invention. In FIG. 3, reference numeral 8' is a movable element coil, reference numeral 10' is a reinforcing beam, and reference numeral 11' is a reinforcing ring. The movable element 7 includes: a coil 8', a reinforcing beam 10' and a reinforcing ring 11'. These components are strongly fixed to the coil by means of adhesion or by means of varnish or impregnation resin applied at the time of winding the coil. In the structure shown in FIG. 3, the reinforcing beam 10' is extended in the stroke direction exceeding the range of the reinforcing rings 11', 11' and directly joined to a body to be moved. Therefore, it is unnecessary to provide the movable element attaching member 9 shown in FIG. 2.

Due to the above structure, the reinforcing beam 10 and the reinforcing ring 11 prevent deformation of the coil 8. Therefore, the rigidity of the movable coil can be greatly enhanced.

In this connection, since the reinforcing beam 10 and the reinforcing ring 11 prevent from deformation of the coil 8, rigidity of the movable coil is highly enhanced. Therefore, the movable element ring 9 is made of alumina ceramics, and the reinforcing beam 10 and the reinforcing ring 11 are made of carbon fiber reinforced plastics (CFRP).

As described above, according to the present embodiment, when the armature coil (the movable element 7') is formed into a coil-shape having a cavity portion and the reinforcing beam 10' made of non-magnetic and highly rigid material is provided at the substantial center of the cavity portion, the reinforcing beam 10' prevents deformation of the movable coil 8'. Accordingly, the rigidity of the movable coil 8' can be greatly enhanced.

When the highly rigid reinforcing members 11', 11', the shapes of which are the same as the coil section, are arranged on both end faces of the coil 8', the reinforcing beam 10' and the reinforcing ring 11' prevent deformation of the coil 8'. Therefore, the rigidity of the movable coil can be greatly enhanced.

Figure 6:
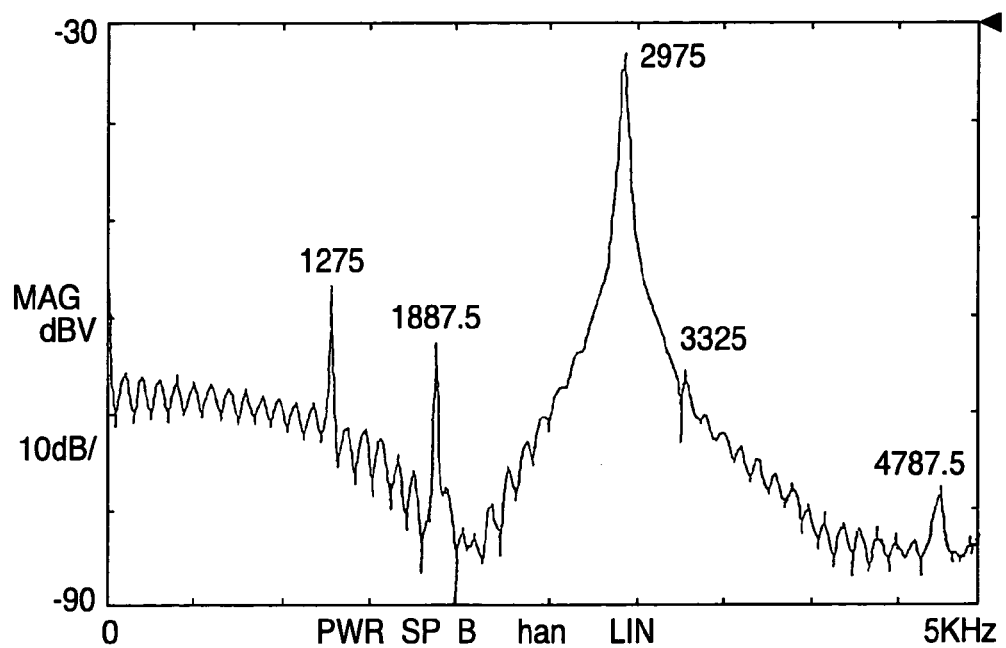
FIG. 6 is a diagram showing a result of measurement of the natural frequency of the movable element of the embodiment of the present invention.

FIG. 6 is a diagram showing a result of natural frequency of the movable element of the voice coil motor, to which the present invention is applied, in free oscillation. In the diagram, the axis of ordinates represents a gain, and the axis of abscissas represents a frequency.

FIG. 7 is a diagram showing a result of natural frequency of the movable element of the voice coil motor of the prior art in free oscillation. In the diagram, the axis of ordinates represents a gain, and the axis of abscissas represents a frequency.

When both are compared with each other, the following can be said. The motor characteristics are approximately the same with each other. However, concerning the primary natural frequency, in the case where the present invention is applied, the primary natural frequency is 1275 Hz, and the maximum gain frequency is 2975 Hz, as shown in FIG. 6.

On the other hand, as shown in FIG. 7 which is related to the movable element of the voice coil motor of the prior art, the primary natural frequency is 700 Hz, and the maximum gain frequency is 962.5 Hz. Accordingly, it can be understood that the rigidity of the movable element of the voice coil motor (shown in FIG. 6) of the present invention is higher than the rigidity of the movable element of the voice coil motor (shown in FIG. 7) of the prior art. However, in this case, since a force of excitation at the time of measurement in the case of the movable element of the voice coil motor of the present invention is different from a force of excitation at the time of measurement in the case of the movable element of the voice coil motor of the prior art, it is impossible to compare the gain of the movable element of the voice coil motor of the present invention with the gain of the movable element of the voice coil motor of the prior art.

INDUSTRIAL APPLICABILITY

The present invention can be utilized for a field in which a voice coil motor capable of enhancing the rigidity characteristic without affecting the magnetic circuit is manufactured when the invention is applied to a movable coil type voice coil motor especially used for a semiconductor related device or a machine tool.

The invention claimed is:

1. A voice coil motor of the movable coil type comprising:
a stator comprising a yoke divided into two portions forming a cylindrical space therein, and a permanent magnet mounted on an inside of the divided yoke; and a movable element of an armature coil accommodated in the cylindrical space of the stator comprising:
 - a highly rigid reinforcing movable element attaching member attached to one end of the armature coil in the stroke direction and provided with a protrusion extending across a gap in the divided yoke, the member having the same shape as a coil section of the armature coil;
 - a highly rigid reinforcing ring having the same shape as the coil section fixed at the other end of the armature coil in the stroke direction; and
 - a reinforcing beam made of non-magnetic and highly rigid which extends laterally inside the armature coil from one side to the other through substantially the center of the coil and extends longitudinally in the stroke direction from the movable element attaching member to the reinforcing ring, the beam fixed to the inside of the armature coil, radially inside the protrusion of the movable element attaching member.

* * * * *